United States Patent
Hong et al.

(10) Patent No.: US 10,721,118 B2
(45) Date of Patent: Jul. 21, 2020

(54) METHOD FOR CONFIGURING DUAL-CONNECTIVITY BY TERMINAL, AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/300,557

(22) PCT Filed: May 11, 2017

(86) PCT No.: PCT/KR2017/004873
§ 371 (c)(1),
(2) Date: Nov. 10, 2018

(87) PCT Pub. No.: WO2017/196095
PCT Pub. Date: Nov. 16, 2017

(65) Prior Publication Data
US 2019/0342148 A1     Nov. 7, 2019

(30) Foreign Application Priority Data

| May 12, 2016 | (KR) | 10-2016-0058157 |
| Jul. 1, 2016 | (KR) | 10-2016-0083270 |
| May 8, 2017 | (KR) | 10-2017-0057549 |

(51) Int. Cl.
*H04L 12/24*     (2006.01)
*H04W 76/15*     (2018.01)
(Continued)

(52) U.S. Cl.
CPC ...... *H04L 41/0668* (2013.01); *H04L 41/0803* (2013.01); *H04W 28/0252* (2013.01);
(Continued)

(58) Field of Classification Search
None
See application file for complete search history.

(56) References Cited

U.S. PATENT DOCUMENTS

| 2014/0269575 A1* | 9/2014 | Zhang | H04W 76/15 370/329 |
| 2015/0043492 A1* | 2/2015 | Baek | H04W 76/15 370/329 |

(Continued)

FOREIGN PATENT DOCUMENTS

| KR | 10-2014-0120807 A | 10/2014 |
| KR | 10-2015-0109174 A | 10/2015 |

(Continued)

*Primary Examiner* — Xavier S Wong
(74) *Attorney, Agent, or Firm* — IP Legal Services, LLC

(57) ABSTRACT

Provided are a method and apparatus for configuring dual-connectivity by a terminal, The method may include: performing configuration by adding a secondary base station signaling radio bearer (SRB); receiving a radio resource control (RRC) message including radio resource configuration information associated with a secondary base station or a secondary cell group through the secondary base station SRB; and transmitting a failure information message to a master base station when it is not possible to comply with the radio resource configuration information included in the RRC message.

15 Claims, 8 Drawing Sheets

(51) Int. Cl.
   *H04W 76/27*   (2018.01)
   *H04W 28/02*   (2009.01)
   *H04W 88/06*   (2009.01)

(52) U.S. Cl.
   CPC .......... *H04W 76/15* (2018.02); *H04W 76/27* (2018.02); *H04W 88/06* (2013.01)

(56) References Cited

U.S. PATENT DOCUMENTS

| | | |
|---|---|---|
| 2015/0124748 A1 | 5/2015 | Park et al. |
| 2016/0028585 A1* | 1/2016 | Wager .................... H04B 7/024 455/452.2 |
| 2016/0044743 A1* | 2/2016 | Xu ........................ H04W 76/34 370/329 |
| 2016/0057658 A1* | 2/2016 | Horn ....................... H04L 43/16 370/236 |
| 2016/0057800 A1 | 2/2016 | Ingale et al. |
| 2016/0057802 A1 | 2/2016 | Lee et al. |
| 2016/0191221 A1* | 6/2016 | Fukuta .............. H04W 72/0413 370/329 |
| 2016/0285716 A1 | 9/2016 | Pelletier et al. |
| 2018/0241653 A1 | 8/2018 | Pelletier et al. |

FOREIGN PATENT DOCUMENTS

| | | |
|---|---|---|
| KR | 10-2016-0048177 A | 5/2016 |
| WO | 2015/066385 A2 | 5/2015 |

* cited by examiner

METHOD FOR CONFIGURING DUAL-CONNECTIVITY BY TERMINAL, AND APPARATUS THEREFOR

CROSS REFERENCE TO RELATED APPLICATIONS

This application is a National Stage Patent Application of PCT International Patent Application No. PCT/KR2017/004873 (filed on May 11, 2017) under 35 U.S.C. § 371, which claims priority to Korean Patent Application Nos. 10-2016-0058157 (filed on May 12, 2016), 10-2016-0083270 (filed on Jul. 1, 2016), and 10-2017-0057549 (filed on May 8, 2017), the teachings of which are incorporated herein in their entireties by reference.

TECHNICAL FIELD

The present disclosure relates to a method and apparatus for a user equipment configuring dual connectivity. In particular, the present disclosure relates to a method and apparatus for a user equipment configuring multi-connectivity by using a plurality of base stations that use radio access networks different from one another (e.g., radio access technologies different from one another.)

DESCRIPTION OF THE RELATED ART

Due to advances in communication systems, various types of wireless devices have been introduced to consumers such as companies and individuals.

Mobile communication systems have employed technologies related to the 3rd generation partnership project (3GPP), such as Long Term Evolution (LTE), LTE-Advanced, or the like. Such mobile communication systems have been designed for transmitting and receiving a large amount of various data, such as video data, radio data, or the like, at a high speed.

For transmitting and receiving a further large amount of data at an even higher speed, a technology has been needed to use small cells. In particular, a technology has been needed for enabling a user equipment to use both of i) a macro cell having a wide coverage and ii) a small cell having a relatively narrow coverage to transmit and receive data, thereby increasing traffic throughput of the user equipment. That is, such a technology may enable a user equipment to use a plurality of base stations including a base station providing a macro cell and a base station providing a small cell for transmitting and receiving data.

After LTE-Advanced, technologies for next generation radio access networks have been developed for enabling a user equipment to transmit and receiving even more data and providing higher Quality of Service (QoS). For example, 3GPP have developed 5G network technologies.

Such 5G network technologies (e.g., next generation technologies) are required to have comparability with user equipments and base stations employing typical network technologies in order to enable a user equipment to have communication services through both of the typical network and the 5G network.

A dual connectivity technology enables a user equipment to maintain connectivity with multiple base stations simultaneously. Due to the introduction of the 5G access network technology (e.g., next generation access network technology), it is necessary for improving such a dual connectivity technology to use base stations using different network technologies.

However, no method has been defined or introduced for enabling a user equipment to have dual connectivity of a base station employing typical network technologies and a base station employing the next generation network technologies.

DETAILED DESCRIPTION OF THE INVENTION

Technical Problem

The present disclosure addresses the above needs, as well as others, and proposes a specific procedure and operation for enabling a user equipment to have dual connectivity with a plurality of base stations.

In addition, the present disclosure is related to a method and apparatus for enabling a user equipment to have dual connectivity with a plurality of base stations including one employing different access network technologies from the other.

Technical Solution

In accordance with an aspect of the present disclosure to solve the above problems, a method of a user equipment may be provided for configuring dual connectivity. The method may include adding and configuring a secondary base station signaling radio bearer (SRB), receiving a radio resource control (RRC) message including radio resource configuration information on a secondary base station or a secondary cell group through the secondary base station SRB, and transmitting a failure information message to a master base station in case the user equipment is unable to comply with the radio resource configuration information included in the RRC message.

In accordance with another aspect of the present disclosure, a method of a secondary base station may be provided for controlling the dual connectivity of a user equipment. The method may include determining to add a secondary base station signaling radio bearer (SRB) to the user equipment, transmitting a radio resource control (RRC) message including radio resource configuration information on a secondary base station or a secondary cell group to the user equipment through the secondary base station SRB, and receiving a response message for a radio resource configuration through the secondary base station SRB if the user equipment successfully complies with a radio resource on the secondary base station, the user equipment configuring dual connectivity by using a master base station and the secondary base station.

In accordance with further another aspect of the present disclosure, a user equipment may be provided for configuring dual connectivity. The user equipment may include a controller additionally configuring a secondary base station signaling radio bearer (SRB), a receiver configured to receive a radio resource control (RRC) message including radio resource configuration information on a secondary base station or a secondary cell group through the secondary base station SRB, and a transmitter configured to transmit a failure information message to a master base station in case the user equipment is unable to comply with the radio resource configuration information included in the RRC message.

In accordance with still further another aspect of the present disclosure, a secondary base station may be provided for controlling dual connectivity of a user equipment. The base station may include a controller configured to determine to add a secondary base station signaling radio bearer (SRB) to the user equipment, a transmitter configured to transmit a radio resource control (RRC) message including radio resource configuration information on a secondary base station or a secondary cell group to the user equipment through the secondary base station SRB, and a receiver configured to receive a response message for a radio resource configuration through the secondary base station SRB if the user equipment successfully complies with a radio resource on the secondary base station, the user equipment configuring the dual connectivity by using a master base station and the secondary base station.

Advantageous Effects

In accordance with embodiments of the present disclosure, a user equipment is able to configure dual connectivity with a plurality of base stations including one employing radio access network technologies different from the other, thereby efficiently providing high quality services In accordance with embodiments of the present disclosure, a user equipment is able to configure dual connectivity with base stations including one employing radio access network technologies different from the other, thereby providing a communication service without errors.

MODE FOR CARRYING OUT THE INVENTION

Figure 1:
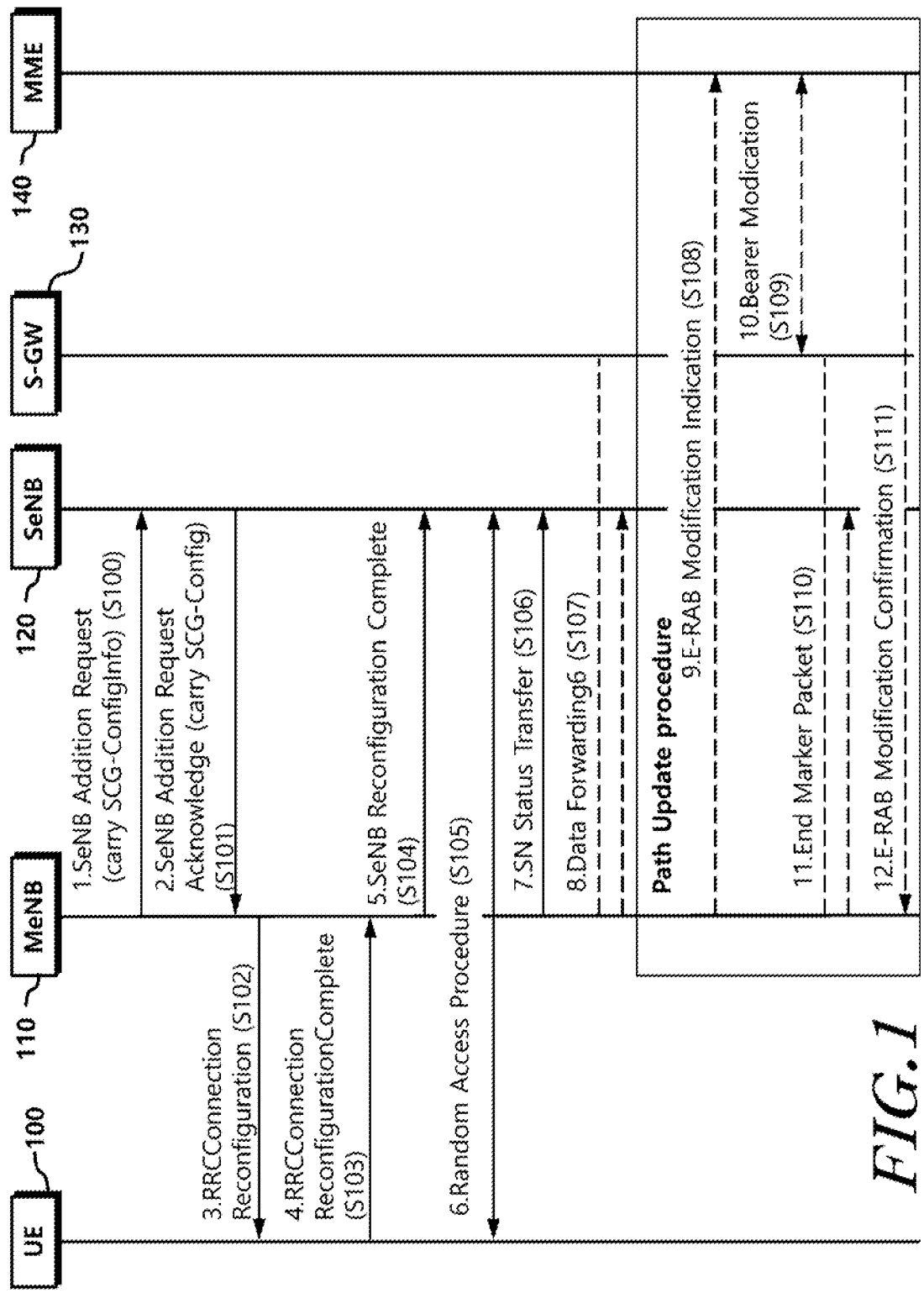
FIG. 1 is a signal flow diagram illustrating a procedure of adding a secondary base station according to a typical technology.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a machine type communication (MTC) device may refer to a device that supports low cost (or low complexity), a device that supports coverage enhancement, or the like. The MTC device may refer to a device that supports low cost (or low complexity), a device that supports coverage enhancement, or the like. The MTC device may refer to devices defined in a predetermined category for supporting low cost (or low complexity) and/or coverage enhancement.

In other words, the MTC device may refer to a low cost (or low complexity) user equipment (UE) category/type newly defined in 3GPP Release-13 and performing LTE-based MTC-related operations. The MTC device of the present disclosure may refer to a UE category/type defined in or before 3GPP Release-12, which supports enhanced coverage in comparison with the typical LTE coverage or supports low power consumption, or may refer to a low cost (or low complexity) UE category/type newly defined in Release-13.

In the present disclosure, wireless communication systems are widely deployed to provide various communication services, such as a voice communication service, a packet data service, etc. The wireless communication system includes a user equipment (UE) and a base station (BS, or eNB). In the present disclosure, the UE is defined as a generic term including devices used in wireless communication, and therefore includes as well as UEs in the wideband code division multiple access (WCDMA), long term evolution (LTE), high speed packet access (HSPA), and the like, a mobile station (MS) in the global system for mobile communications (GSM), a user terminal (UT), a subscriber station (SS), a wireless device, or the like.

The BS or a cell generally refers to a station communicating with the UE. The BS or cell may be referred to as a Node-B, an evolved Node-B (eNB), a sector, a site, a base transceiver system (BTS), an access point, a relay node, a remote radio head (RRH), a radio unit (RU), a small cell, or the like.

That is, the BS or cell is defined as a generic term including as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Since each of the above-described various cells is controlled by a BS, therefore the BS may be classified into two categories. That is, the BS may be referred to i) an apparatus that provides a megacell, a macrocell, a microcell, a picocell, a femtocell, or a small cell, for a radio coverage area, or ii) the radio coverage area itself. In i), the BS may be referred to i) any or all apparatuses providing any radio coverage area and are controlled by one identical entity, or ii) any or all apparatus cooperate with each other to configure the radio coverage area. According to a method of establishing a radio coverage area, the BS may be referred to as an eNB, a RRH, an antenna, a RU, a low power node (LPN), a point, a transmission/reception point, a transmission point, a reception point, or the like. In ii), the BS may be a radio coverage area itself for transmitting or receiving a signal from UE perspective or neighboring BS perspective.

Accordingly, the megacell, the macrocell, the microcell, the picocell, the femtocell, or the small cell, the RRH, the antenna, the RU, the LPN, the point, the eNB, the transmission/reception point, the transmission point, or the reception point are collectively referred to as the BS.

In the present disclosure, the UE and the BS are entities performing transmission or reception operation used to embody the technology and technical spirit described in the present disclosure. The UE and the BS are defined as a generic term and not limited to specific terms or words. The UE and the BS are entities performing uplink or downlink operation used to embody the technology and technical spirit described in the present disclosure. The UE and the BS are defined as a generic term and not limited to a specific term or word. The uplink (UL) refers to a data transmission/reception scheme performed by a UE to/from a BS, and the downlink (DL) refers to a data transmission/reception scheme performed by a BS to/from a UE.

Any of multiple access techniques may be applied to wireless communication systems according to the present disclosure, and therefore no limitation is imposed on them. Various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like, can be used in wireless communication systems according the present disclosure. At least one of embodiments of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

Uplink transmission and downlink transmission may be performed based on i) a time division duplex (TDD) technique performing the transmission through different time slots, or ii) a frequency division duplex (FDD) technique performing the transmission through different frequencies.

Further, in some systems, such as the LTE or LTE-advanced, a related standard specification defines an UL and a DL to be established based on a single carrier or a pair of carriers. The UL and/or the DL may transmit control information through control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. The UL and/or the DL may transmit data information through data channels, such as a physical DL shared channel (PDSCH), a physical UL shared channel (PUSCH), or the like.

Meanwhile, control information may be transmitted through an enhanced PDCCH (EPDCCH) or extended PDCCH (EPDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system according to some embodiments of the present disclosure may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be at least one RRH that is connected to a BS or macrocell (hereinafter, referred to as 'eNB') through an optical cable or an optical fiber and thereby controlled in a wired manner, and that has high transmission power or low transmission power in a macrocell area.

Hereinafter, the DL may denote communication or a communication path from multiple transmission/reception points to a UE, or the UL may refer to communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

In addition, hereinafter, a description of transmitting or receiving a PDCCH or a description of transmitting or receiving a signal through the PDCCH may include meaning of transmitting or receiving an EPDCCH or transmitting or receiving a signal through the EPDCCH.

That is, a physical DL control channel used herein may denote a PDCCH or an EPDCCH and may denote both of the PDCCH and the EPDCCH.

Also, for convenience of description, an EPDCCH according to at least one of embodiments of the present disclosure may be applied to a description or an embodiment including a PDCCH, and the PDCCH may be applied to a description or an embodiment including the EPDCCH.

Meanwhile, higher layer signaling described below includes radio resource control (RRC) signaling transmitting RRC information containing an RRC parameter.

The eNB performs DL transmission to UEs. The eNB may transmit a PDSCH which is a primary physical channel for unicast transmission, and a PDCCH for transmitting i) DL control information such as scheduling required to receive the PDSCH and ii) scheduling approval information for transmission through an UL data channel (for example, a PUSCH). Hereinafter, transmission and reception of a signal through each channel will be described as transmission and reception of a corresponding channel.

LTE Dual Connectivity operation

Typical LTE technologies support dual connectivity for a UE to simultaneously use radio resources of two BSs. A dual connectivity operation for a multiple RX/TX UE in an RRC connected state is configured to utilize the radio resources provided by two different schedulers connected to two BSs connected to each other through non-ideal backhaul.

A UE in the dual connectivity may provide services through two BSs. For example, the UE may perform communication by using a master BS (MeNB) and a secondary BS (SeNB). The MeNB may provide an RRC connection to the UE and may denote a reference BS for performing a handover. The SeNB denotes a BS providing an additional radio resource to the UE.

To provide a SeNB radio resource to a UE, a procedure for adding a SeNB is used for establishing a UE context to the SeNB.

FIG. 1 is a diagram illustrating a procedure of adding a secondary BS according to a typical technology.

Each operation will be described with reference to FIG. 1.

1. The MeNB 110 decides to request the SeNB 120 to allocate radio resources for a specific E-RAB, indicating E-RAB characteristics (E-RAB parameters, TNL address information corresponding to the UP option) at step S100. In addition, the MeNB 110 indicates within SCG-ConfigInfo a MCG configuration (including security algorithm for SCG bearer) and the entire UE capabilities for UE capability coordination to be used as basis for the reconfiguration by the SeNB 120, but does not include SCG configuration. The MeNB 110 may provide the latest measurement results for the SCG cell(s) requested to be added. The SeNB 120 may reject the request.

2. If an RRM entity in the SeNB 120 is able to admit the resource request, it allocates respective radio resources and, dependent on the bearer option, respective transport network resources at step S101. The SeNB 120 triggers Random Access to perform synchronization of the SeNB 120 radio resource configuration. The SeNB 120 provides the new radio resource of SCG in SCG-Config to the MeNB 110. For SCG bearers, together with S1 DL TNL address information for the respective E-RAB and security algorithm, X2 DL TNL address information for split bearers is provided.

3. If the MeNB 110 endorses the new configuration, the MeNB 110 transmits an RRCConnecnonReconfiguranon message to the UE including the new radio resource configuration of SCG according to the SCG-Config at step S102.

4. The UE applies the new configuration and replies with an RRCConnecnonReconfiguranonComplete message at step S103. In case the UE is unable to comply with (part of) the configuration included in the RRCConnecnonReconfiguranon message, it performs a reconfiguration failure procedure.

5. The MeNB 110 informs the SeNB 120 that the UE has completed the reconfiguration procedure successfully at step S104.

6. The UE performs synchronization towards the PSCell of the SeNB 120 at step S105. The UE transmits the RRCConnecnonReconfiguranonComplete message and performs the Random Access procedure towards the SCG is not defined. The successful RA procedure towards the SCG is not required for a successful completion of the RRC Connection Reconfiguration procedure.

7./8. In case SCG bearers, and dependent on the bearer characteristics of the respective E-RAB, the MeNB (110) may take actions to minimize service interruption due to activation of dual connectivity (Data forwarding, SN Status Transfer) at steps S106 and S107.

9.-12. For SCG bearers, the update of the UP path towards the EPC is performed at steps S108 to S111.

If the MeNB 110 transmits anRRCConnectionReconfiguration message including a new radio resource configuration of a secondary cell group in S102, the UE 100 applies the new configuration, as in S103. In case the UE 100 is unable to comply with (part of) the configuration included in the RRCConnectionReconfiguration message, it performs a reconfiguration failure procedure.

The typical dual connectivity of the LTE may be provided based on coordination between two LTE BSs. In such a typical dual connectivity, the MeNB 110 is able to understand an RRC message of the SeNB 120. Further, the MeNB 110 generates a final RRC message in consideration of coordination between the UE capabilities and the SeNB 120 and transmits it to the UE 100. Therefore, it is possible to efficiently utilize the radio resources of the two BSs. The RRC message is provided through only radio interfaces of the UE 100 and the MeNB 110.

NR(New Radio)

Recently, the 3rd generation partnership project (3GPP) has carried out a "Study on New Radio Access Technology" (hereinafter, for convenience of description, referred to as a new radio (NR)). As architecture for the NR and a requirement for migration, a RAN architecture is required to support tight interworking between the NR and the LTE. A LTE dual connectivity technology is expected to be reused for tight interworking between the NR and the LTE. However, a number of evolutionary features over a physical layer, a layer 2 protocol and a relevant procedure are introduced into the NR as new radio access. Accordingly, when the tight interworking between the NR and the LTE is supported, it is very difficult in reality to make an LTE BS support all features of the NR that will evolve in the future. This is the reason why, whenever the NR BS evolves, updating the LTE BS together also places an excessive burden on the currently constructed LTE BS. Accordingly, in dual connectivity configured based on the LTE BS and the NR BS, the LTE BS is required to be able to operate even if the LTE BS cannot understand an RRC message generated by the NR BS. In this case, the LTE BS cannot identify a change of a radio resource configuration of the NR BS. Therefore, it is impossible to configure a UE to exceed UE capabilities.

In addition, in the typical dual connectivity technology, it is able to transmit an RRC message through only an MeNB. For example, in a case where a radio resource of a SeNB is changed by requesting of the MeNB, it is possible to configure radio resource configuration information of a SeNB through the MeNB. Accordingly, in order to change the radio resource of the NR BS, there is transmission delay generated between BSs at all times.

In addition, the LTE-based dual connectivity is provided based on coordination between LTE BSs. That is, both BSs can support LTE features as an LTE BS. In addition, there is a problem that the NR BS cannot directly generate and transmit an RRC message.

The present disclosure is proposed to solve this problem and provides a method and apparatus for configuring a signaling radio bearer to an LTE BS and an NR BS and a UE, in order to provide radio resource control signaling for an LTE-NR dual connection operation supporting tight interworking between the LTE and the NR. In addition, the present disclosure provides a method of effectively processing radio connection in a signaling process between an LTE BS and an NR BS and/or between a UE and any of the LTE BS and the NR BS.

In addition, the present disclosure provides a method and apparatus for adding a NR BS supporting tight interworking between the LTE and the NR.

The embodiments of the present disclosure may be applied to, as well as LTE mobile communication UEs, a next generation mobile communication (for example, 5G mobile communication) UEs.

For convenience of description, hereinafter, a BS may be referred to as an LTE BS, which is an eNodeB of LTE/E-UTRAN, or in a 5G radio network in which a central unit (CU) and a distribute unit (DU) are separated, a gNodeB, a NR Node or a NR BS (CU, DU, or an entity in which the CU and the DU are configured with one logical entity, hereinafter, for convenience of description, referred to as "NR BS", but all entities described above may be included in the scope of the present disclosure.)

Furthermore, in order to describe a method of establishing dual connectivity of an LTE BS and a NR BS using radio access technologies different from each other, in the present disclosure, if necessary, the LTE BS may be referred to as a master BS and the NR BS may be referred to as a secondary BS. In this case, the present disclosure may also be applied to dual connectivity between LTE BSs. Accordingly, the same may be applied to a case where the secondary BS is an LTE BS.

Accordingly, the LTE BS and the NR BS are separately described below, and when it is necessary to specifically describe an operation according to the dual connectivity, the LTE BS is described as a master BS (MeNB) and the NR BS is described as a secondary BS (SeNB). The name of each BS is for convenience of understanding, and therefore the LTE BS may denote an eNB and the NR BS may denote a gNB. That is, in the present disclosure, the separate BSs are described with the intention of distinguishing between base stations using different radio access technologies, but the terms are not limited thereto.

Following scenarios may be considered for a core network connection in dual connectivity for the NR.
- If the NR is integrated into the LTE and connected through EPC, a control plane may be connected between an LTE BS and an EPC entity (MME) and a user plane may be separated from a core network or a radio network.
- If the LTE is integrated into the NR and connected through NG-Core (5G core network), a control plane may be connected between a NR BS and an NG-Core control plane entity and a user plane may be separated from a core network or a radio network.
- If the NR is integrated into the LTE and connected through NG-Core (5G core network), a control plane may be connected between an LTE BS and an NG-Core control plane entity and a user plane may be separated from a core network or a radio network.

Following three cases may be considered as dual connectivity or multi-connectivity (hereinafter, for convenience of description, referred to as "dual connectivity", but the present disclosure includes a case where two or more dual connectivity are provided.)
- LTE(Master Node)—NR(Secondary Node)
- NR(Master Node)—NR(Secondary Node)
- NR(Master Node)—LTE(Secondary Node)

For convenience of description, the present disclosure describes the LTE(Master Node)—NR(Secondary Node) case in which well-established LTE coverage can be utilized as an example case. However, as described above, this selection is for convenience of description, and therefore, either NR(Master Node)—NR(Secondary Node) case or NR(Master Node)—LTE(Secondary Node) case is also included within the scope of present disclosure.

Figure 2:
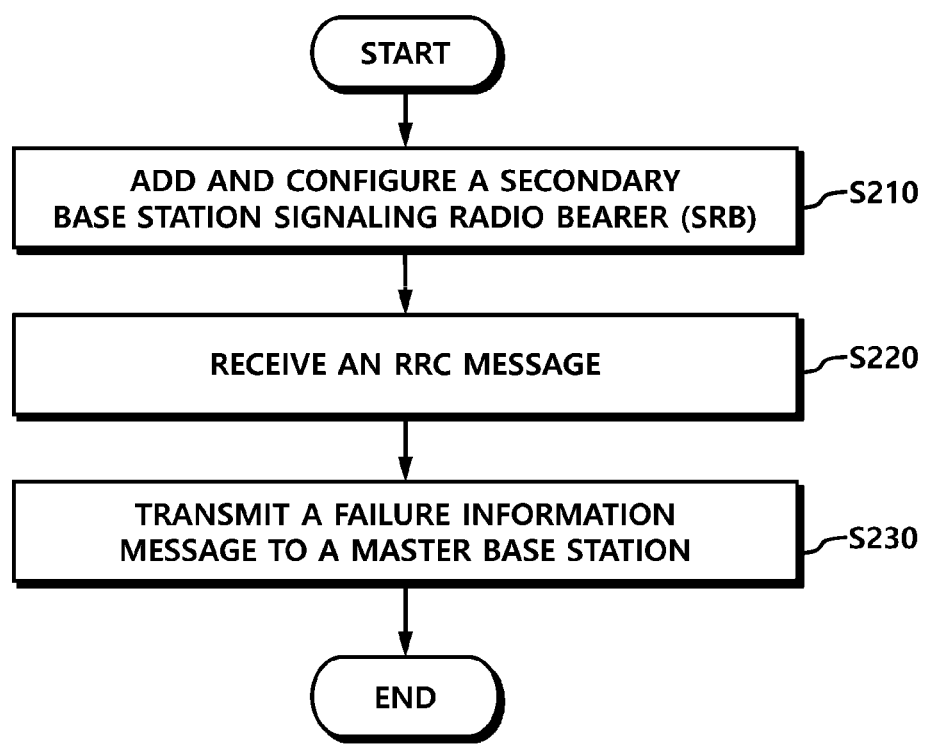
FIG. 2 is a flowchart illustrating operation of a user equipment according to some embodiments of the present disclosure.

FIG. 2 is a flowchart illustrating operation of a UE according to some embodiments of the present disclosure.

Referring to FIG. 2, a UE configuring dual connectivity may add and configure a secondary BS signaling radio bearer (SRB) at step S210. For example, according to secondary BS SRB configuration information included in an RRC message received from a master BS, the UE may add the secondary BS SRB and configure it in the UE. As described above, the secondary BS denotes a NR BS. Meanwhile, the addition of the secondary BS SRB may be determined by the secondary BS. That is, the secondary BS may determine whether to add the secondary BS SRB to the UE.

The addition of the secondary BS SRB may be configured when the master BS performs a secondary BS addition procedure.

The master BS and the secondary BS are BSs using radio access technologies different from each other. For example, the master BS may be an eNB, and the secondary BS may be a gNB.

In addition, the UE may receive a radio resource control (RRC) message including radio resource configuration information on the secondary BS or a secondary cell group through the secondary BS SRB at step S220. For example, the UE may receive radio resource configuration information on the secondary BS through the additionally configured secondary BS SRB. As another example, the UE may receive radio resource configuration information on the secondary cell group through the secondary BS SRB. The radio resource configuration information on the secondary BS or the secondary cell group may be received being included in an RRC message.

Here, the secondary cell group (SCG) denotes one or more cells associated with the secondary BS, and one or more cells associated with the master BS may referred to as a master cell group. That is, when configuring the dual connectivity, the UE may use one cell of a BS or a plurality of cells each controlled by a corresponding BS.

In case the UE is unable to comply with radio resource configuration information included in an RRC message, the UE may perform an operation to transmit a failure information message to the master BS at step S230. For example, the UE may comply with, in the UE, a secondary BS or a secondary cell group configuration by using the received radio resource configuration information. Meanwhile, it may not be possible to configure dual connectivity by using the received radio resource configuration information due to any reason. In this case, the UE may transmit a failure information message to the master BS and inform it of dual connectivity configuration failure of the UE.

In addition, when the UE fails to configure the secondary BS radio resource because the UE is unable to comply with the radio resource configuration included in an RRC message, the radio resource on the secondary BS or the secondary cell group may be suspended. For example, the radio resources on the secondary BS or the secondary cell group, which are the target resources to be suspended, may be at least one of a secondary cell group data radio bearer (DRB), a secondary cell group SRB, a part of a secondary cell group of a split DRB, and a part of a secondary cell group of a split SRB. The failure of the UE to configure the secondary BS radio resource because the UE is unable to comply with radio resource configuration information included in the RRC message denotes the failure of the RRC configuration because the UE is not allowed to comply with the radio resource configuration information included in the RRC message.

In addition, the failure information message transmitted to the master BS may include cause information on the failure of configuring the secondary BS radio resource.

In this case, the secondary BS may recognize the configuration failure by receiving the failure information message from the master BS.

Meanwhile, if the UE successfully complies with the received radio resource configuration information and performs the radio resource configuration, the UE may transmit confirmation information on radio resource configuration success to the secondary BS through the secondary BS SRB.

Figure 3:
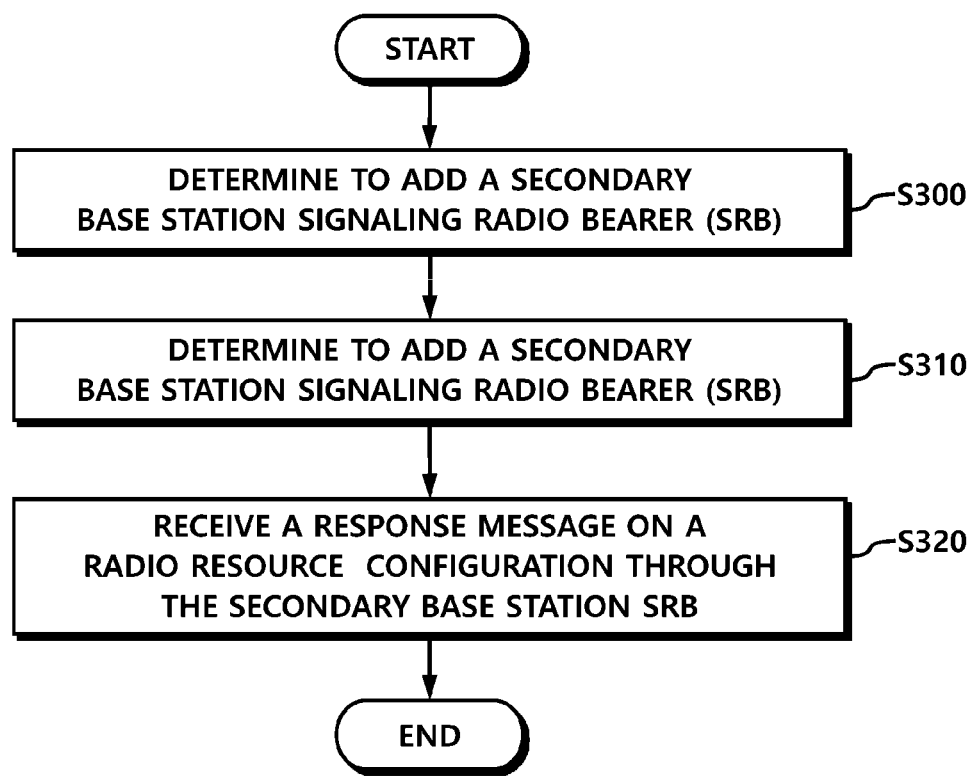
FIG. 3 is a flowchart illustrating operation of a base station according to some embodiments of the present disclosure.

FIG. 3 is a flowchart illustrating operation of a BS according to some embodiments of the present disclosure.

Referring to FIG. 3, a secondary BS controls dual connectivity of a UE. Such a secondary BS may determine to add a secondary BS signaling radio bearer (SRB) to the UE at step S300. As described above, the secondary BS denotes a NR BS. Meanwhile, the addition of the secondary BS SRB may be determined by the secondary BS. That is, the secondary BS may determine whether to add the secondary BS SRB to the UE. When a master BS performs a secondary BS addition procedure, the UE may add a secondary BS SRB.

The master BS and the secondary BS are BSs using radio access technologies different from each other. For example, the master BS may be an eNB and the secondary BS may be a gNB.

The secondary BS may transmit a radio resource control (RRC) message including radio resource configuration information on the secondary BS or a secondary cell group to the UE through the secondary BS SRB at step S310. For example, the secondary BS may transmit radio resource configuration information on the secondary BS to the UE through the additionally configured secondary BS SRB. As another example, the secondary BS may transmit radio resource configuration information on the secondary cell group through the secondary BS SRB. The radio resource configuration information on the secondary BS or the secondary cell group may be transmitted being included in an RRC message.

Here, the secondary cell group (SCG) denotes one or more cells associated with the secondary BS, and one or more cells associated with the master BS may referred to as a master cell group. That is, when configuring the dual connectivity, the UE may use one cell of each BS or a plurality of cells each controlled by a corresponding BS.

If the UE successfully complies with the radio resource on the secondary BS, the secondary BS may receive a response message for the radio resource configuration from the UE through the secondary BS SRB at step S320. Through this, the UE may configure dual connectivity by using the master BS and the secondary BS.

It may not be possible to configure dual connectivity by using the received radio resource configuration information due to any reason. In this case, the UE may transmit a failure information message to the master BS for informing the master BS of dual connectivity configuration failure in the UE. The failure information message transmitted to the master BS may include cause information on the secondary BS radio resource configuration failure. In this case, the secondary BS may identify the cause of the failure by receiving information on the secondary BS radio resource configuration failure from the master BS.

In addition, when the UE fails to configure the secondary BS radio resources because the UE is unable to comply with the radio resource configuration included in an RRC message, the radio resource on the secondary BS or the secondary cell group may be suspended. For example, the radio resources on the secondary BS or the secondary cell group, which are target resources to be suspended, may be at least one of a secondary cell group data radio bearer (DRB), a secondary cell group SRB, a part of a secondary cell group of a split DRB, and a part of a secondary cell group of a split SRB. At this time, the failure of the second BS radio resource configure because the UE is unable to comply with radio resource configuration information included in the RRC message denotes the failure of the RRC configuration because the UE is not allowed to comply with the radio resource configuration information in the RRC message.

Through operations described above, a UE may be able to configure dual connectivity by using a plurality of BSs that use radio access network technologies different from one another.

Hereinafter, more various embodiments for operations of the UE and the BS in each step described above will be described.

In typical LTE dual connectivity, each LTE node has responsibility for UE resource configuration and allocation of a corresponding LTE node (cell group). An MeNB and a SeNB may understand each other's RRC configuration for a UE. The MeNB is used as basic data for reconfiguration by SeNB in SCG-ConfigInfo and indicates an MCG configuration and overall UE capabilities for performing UE capability coordination. The SeNB provides the MeNB with a new radio resource of a SCG in SCG-Config.

However, the NR, as new radio access, may introduce a number of evolutionary features over a physical layer, a layer 2 protocol and a relevant procedure. Accordingly, when the tight interworking between NR and LTE is supported, it may not be proper in reality to make an LTE BS understand and support all features of the NR that will evolve in the future. A LTE technology and NR technology can evolve independently depending on a corresponding use case. Accordingly, except for some information elements for coordination between LTE BSs and NR BSs, it is necessary for the LTE BSs not to be required to understand all NR configurations.

For example, for coordination with the NR BS, the LTE BS may transmit to the NR BS specific information elements to be used by the NR BS as basic data for NR radio resource reconfiguration. As another example, the NR BS may separate information elements to be transmitted to the LTE BS for coordination with the LTE BS from NR configuration information (or NR reconfiguration information) for configuring an NR radio resource of the UE. Then, the NR BS separately transmit the information elements and the NR configuration information to the LTE BS. The LTE BS may transmit them to a UE through interfaces between the LTE BS and the UE. As another example, the LTE BS may separate information elements to be transmitted to the NR BS for coordination with the NR BS and LTE configuration information (or LTE reconfiguration information) for configuring an LTE radio resource of the UE. Then, the LTE BS may separately transmit the information elements ant eh LTE configuration information to the NR BS. The NR BS may transmit them to a UE through interfaces between the NR BS and the UE. For another example, NR configuration information for configuring an NR radio resource of the UE may be transmitted to the LTE BS being included in a container. The LTE BS may transparently transmit this information to the UE. As another example, NR configuration information for configuring an NR radio resource of the UE may be directly transmitted to the UE through interfaces between the NR BS and the UE by the NR BS.

In order to add an NR BS, as in the example described above, the NR configuration information (e.g., radio resource configuration information) for configuring the NR radio resource of the UE may be transmitted to the LTE BS being included in the container. The LTE BS may transmit, to the UE, LTE configuration information for configuring the LTE radio resource of the UE along with NR configuration information for configuring the NR radio resource of the UE. For example, the LTE BS may transmit radio resource-dedicated configuration information for configuring an LTE radio resource, in which NR configuration information for configuring an NR radio resource is included, to the UE. As another example, the LTE BS may separately transmit radio resource-dedicated configuration information for configuring an LTE radio resource and NR radio resource-dedicated configuration information for configuring an NR radio resource, to the UE. For example, the UE having received an RRC message through interfaces between the LTE BS and the UE may transmit an RRC message (or LTE radio resource-dedicated configuration information) including LTE radio resource-dedicated configuration information from an LTE PDCP entity of the UE to an LTE RRC entity. An RRC message (or NR radio resource-dedicated configuration information) including NR radio resource-dedicated configuration information may be transmitted from an LTE PDCP entity of the UE to an LTE RRC entity. As another example, the UE having received an RRC message through interfaces between the LTE BS and the UE may transmit an RRC message (or LTE radio resource-dedicated configuration information) including LTE radio resource-dedicated configuration information and an RRC message (or NR radio resource-dedicated configuration information) including NR radio resource-dedicated configuration information, from an LTE PDCP entity of the UE, to an LTE RRC entity. An LTE RRC entity of the UE may transmit an RRC message (or NR radio resource-dedicated configuration information) including NR radio resource-dedicated configuration information to an NR RRC entity. As another example, the UE having received an RRC message through interfaces between the LTE BS and the UE may transmit an RRC message (or LTE radio resource-dedicated configuration information) including LTE radio resource-dedicated configuration information and an RRC message (or NR radio resource-dedicated configuration information) including NR radio resource-dedicated configuration information, from an LTE PDCP entity of the UE, to an LTE RRC entity. The LTE RRC entity of the UE may comply with a new radio resource according to NR radio resource-dedicated configuration information.

Meanwhile, the NR BS may directly perform NR radio resource control of the UE. The NR BS may perform one or more control functions among an NR cell/cell group/transmission point/transmission point group/transmission and/or reception point/transmission and/or reception point group/TRP/antenna/antenna group/beam addition/modification/release/management, NR measurement, NR measurement reporting, NR resource allocation, NR radio bearer addition/correction/release, NR radio resource configuration, and NR mobility control. The NR BS may perform one or more control functions described above for the UE.

In order to configure an NR BS (addition) radio resource for the UE or in order to reconfigure an NR BS (addition) radio resource for the UE, the following methods are may be used independently or in combination.

1. Using LTE BS Signaling Radio Bearer (SRB)

For example, a NR BS may transmit an NR RRC message (e.g., an RRC message generated by the NR BS) to a UE through an LTE BS. To do this, for a DL RRC message, the NR BS (or an RRC entity of the NR BS) may transmit an NR RRC message including an NR RRC container, NR RRC IEs, NR RRC IEs to the LTE BS. The LTE BS (or an RRC entity of the LTE BS) may transmit an RRC message including an NR RRC container, NR RRC IEs, and/or NR RRC IEs to the UE (or an RRC entity of the UE) through an LTE SRB. The LTE RRC may transmit, to the UE, the RRC message that includes the NR RRC container, NR RRC IEs, and/or NR RRC IEs to the UE, and that is included in an RRC reconfiguration message with a transparent container.

This method is advantageous in that RRC configuration information of the NR BS can be transmitted to the UE while reducing changes of the LTE BS. However, this method increases delays resulted from data transmission between the LTE BS and the NR BS. In addition, the NR BS is required to receive a confirmation message for the NR RRC configuration of the UE from the LTE BS. This also causes delays.

In order to solve this, if an RRC message including an NR RRC container, NR RRC IEs, and/or NR RRC IEs is transmitted to the UE (or an RRC entity of the UE), the LTE BS may indicate that the RRC entity of the UE directly should transmit an RRC reconfiguration confirmation message to the NR BS.

For example, an LTE RRC entity of the UE having received an RRC message including an NR RRC container, NR RRC IEs, and/or NR RRC IEs through an LTE SRB transmits/submits it to an NR RRC entity. The NR RRC entity complies with a new configuration. The NR RRC entity replies to an RRC reconfiguration confirmation message through interfaces between the UE and the NR BS.

As another example, an RRC entity of the UE having received an RRC message including an NR RRC container, NR RRC IEs, and/or NR RRC IEs through an LTE SRB complies with a new configuration. The RRC entity of the UE replies to an RRC reconfiguration confirmation message through interfaces between the UE and the NR BS.

The RRC reconfiguration message (or an RRC message including an NR RRC container, NR RRC IEs, and/or NR RRC IEs) may include information for indicating such an operation of the UE by the NR BS (or the LTE BS).

For example, the RRC reconfiguration message (or an RRC message including an NR RRC container, NR RRC IEs, and/or NR RRC IEs) may include information for indicating the UE to generate/enable/activate an NR RRC entity.

As another example, if the UE receives an RRC message including an NR RRC container, NR RRC IEs, and/or NR RRC IEs (or an RRC message including information indicating an initial NR addition configuration (NR configuration setup)), the UE causes an NR RRC entity to enable/activate an NR addition configuration (or the UE may establish/generate the NR RRC entity.)

As another example, if the UE receives an RRC message including information indicating NR radio resource release, the UE may cause an NR RRC entity to be disabled/deactivated/released.

As another example, an RRC reconfiguration message (or an RRC message including an NR RRC container, NR RRC IEs, and/or NR RRC IEs) may include information for indicating the UE from an NR RRC entity to transmit an RRC confirmation message through interfaces between the UE and the NR BS.

As another example, an RRC reconfiguration message (or an RRC message including an NR RRC container, NR RRC IEs, and/or NR RRC IEs) may include NR BS SRB configuration information for transmitting an RRC confirmation message from an NR RRC entity through interfaces between the UE and the NR BS.

2. SRB configuration through NR BS

For example, an NR BS may transmit an NR RRC message to a UE through interfaces between the NR BS and the UE. To do this, when LTE-NR dual connectivity is configured to a UE (or, when an NR addition radio resource is configured), an NR BS may configure an SRB (e.g., SRB1) between the UE and the NR BS. This denotes that the NR BS determines to add an SRB (e.g., SRB1) between the UE and the NR BS to a corresponding UE, and generates configuration information for this. For reference, a SRB1 is performed in RRC connection establishment in the typical LTE, but SRB1 establishment between the NR BS and the UE (hereinafter, a signaling radio bearer configured to transmit data through interfaces between the NR BS and the UE is referred to as NR-SRB1, but is not limited thereto.)

may be configured through an RRC reconfiguration message configuring LTE-NR dual connectivity (configuring an NR addition radio resource).

When security is activated, a PDCP (or an L2 entity over NR) is required to perform integrity protection and ciphering on all RRC messages over the NR-SRB1 (or SRB1/SRB2). It can be considered that LTE-NR dual connectivity is applied to an RRC connected UE. Accordingly, a PDCP (or an L2 entity (a higher entity) over NR) is required to perform integrity protection and ciphering for all RRC messages over the NR-SRB1 (or SRB1/SRB2).

To do this, for the NR-SRB1, it is required to always active security from the start. An LTE BS is required not to establish this bearer before activating security for the corresponding bearer. The LTE BS is required not to request NR BS addition before activating security. The NR BS may establish an NR-SRB1 according to an NR BS addition request of the LTE BS.

For example, when requesting NR BS addition, the LTE BS transmits (or calculates and then transmits) an NR BS key (e.g., NR-$K_{eNB}$) to the NR BS. The NR BS selects an integrity protection algorithm and/or a ciphering algorithm. Then, the selected integrity protection algorithm and the ciphering algorithm (or identification information for the integrity protection algorithm and the ciphering algorithm) by which the NR-SRB1 is serviced to the UE are transmitted to the UE through the LTE BS. The LTE BS (or NR BS) indicates a counter (SCG counter or NR counter) for the UE counting a key value associated with the NR-SRB1 to the UE. The UE counts an NR BS key. The UE counts a key value (NR-$K_{RRCint}$, NR-$K_{RRCenc}$) associated with the NR-SRB1. The UE configures a lower layer (PDCP or L2 entity over NR) to apply an integrity protection algorithm, ciphering algorithm, NR-$K_{RRCint}$, NR-$K_{RRCenc}$.

Figure 4:
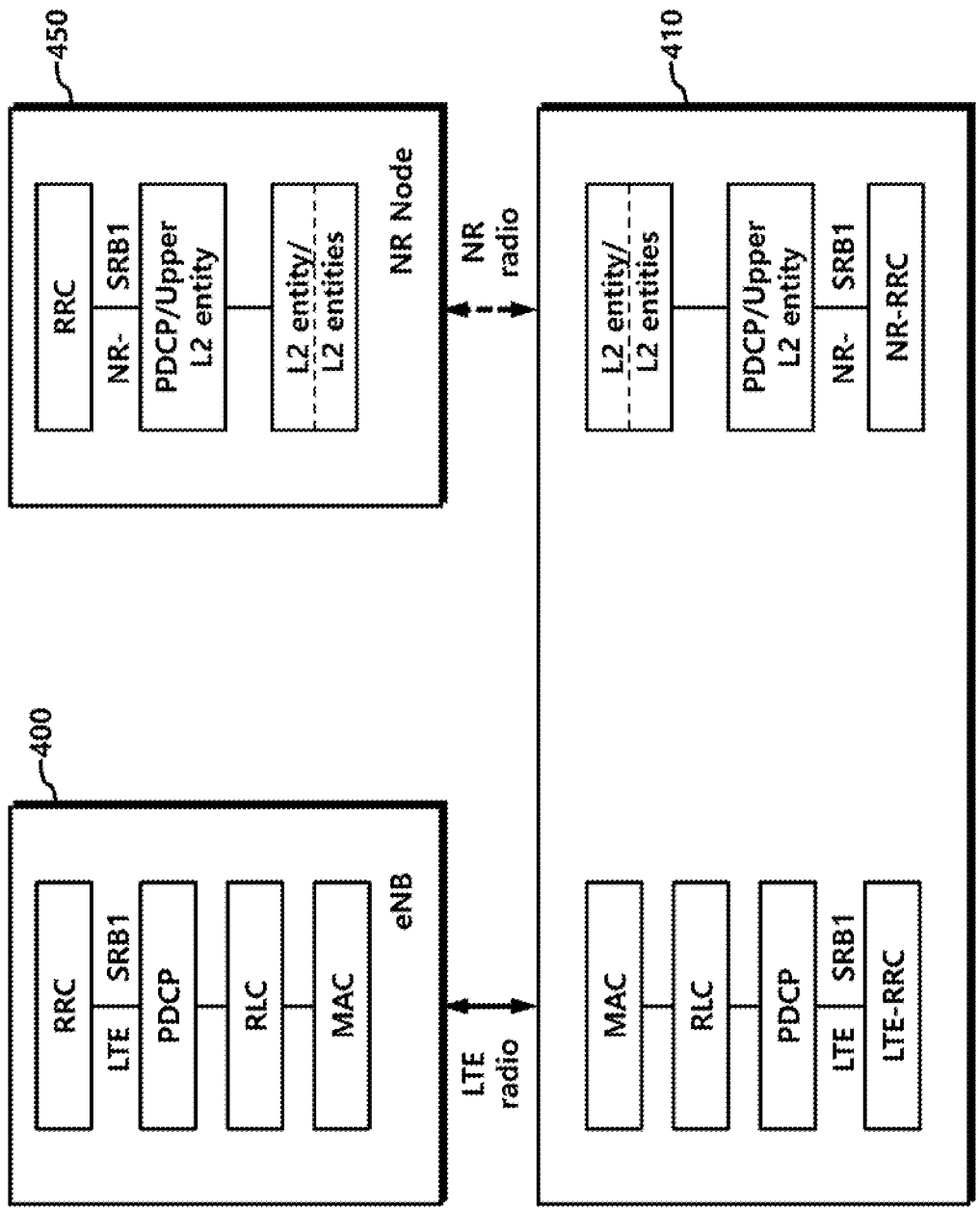
FIG. 4 is a diagram illustrating a dual connectivity signaling radio bearer (SRB) configuration according to an embodiment of the present disclosure.

FIG. 4 is a diagram illustrating a dual connectivity SRS configuration according to an embodiment of the present disclosure.

For example, referring to FIG. 4, an L2 entity of NR 450 may include an RLC entity of LTE 400, one or two entities defined by redistributing LTE MAC entity functions. FIG. 4 shows that each of an LTE-RRC entity and an NR-RRC entity is configured in a UE 410, but it is also within the scope of the present disclosure that a single RRC entity/layer is configured in the UE 410.

If a single RRC entity/layer is configured in the UE 410, data may be transmitted through an NR-SRB1 for an RRC message received from an NR BS 450 and a corresponding response RRC message. If two RRC entities are configured in the UE 410, data may be transmitted through an NR-SRB1 for an RRC message received from an NR BS 450 and a corresponding response RRC message. The NR BS 450 may preferentially process the NR-SRB1 over a DRB. For example, a specific logical channel identification information logicalchannelIdentity) value may be designated to the NR-SRB1. As another example, logical channel identification information (logicalchannelIdentity) value (for example, 1) identical to the SRB1 may be designated to an NR-splitSRB1. As another example, SRB identification information (SRB-identity) value (for example, 1) identical to the SRB1 may be designated to an NR-SRB1. As another example, a logical channel configuration (e.g., priority(1 or 2), prioritisedBitRate(infinite)) value identical or similar to the SRB1 may be designated to an NR-SRB1. As another example, logical channel identification information identical to the SRB1 is included, but information for the UE identifying that this is a SCG SRB1 may be included.

As another example, logical channel identification information different from the SRB1 is included, but logical channel identification information identical to the SRB1 may be included.

The NR BS 450 may transmit to the UE 410 an NR RRC message including one or more control functions among an NR cell/cell group/transmission point/transmission point group/transmission and/or reception point/transmission and/or reception point group/TRP/antenna/antenna group/beam addition/modification/release/management, NR measurement, NR measurement reporting, NR resource allocation, NR radio bearer addition/correction/release, NR radio resource configuration, and NR mobility control. For a DL RRC message, the NR BS (or an RRC entity of the NR BS) 450 may transmit to the UE 410 an NR RRC message including an NR RRC container, NR RRC IEs, and/or NR RRC IEs through the NR-SRB1.

If the UE receives the NR RRC message (e.g., RRC connection reconfiguration message) through the NR-SRB1, the UE may comply with a new configuration by using the following methods independently or in combination. An NR RRC message includes radio resource configuration information for the NR BS. For example, as described above, in the case of dual connectivity, an NR RRC message may include secondary BS (NR BS) radio resource configuration information.

2-1) Methods of Complying with a New Configuration Through a Single RRC Entity in a UE The UE may configure an NR radio resource through the RRC entity.

When an MeNB transmits to a UE an RRC message including a new radio resource configuration of a SCG in the typical LTE dual connectivity, the UE performs a reconfiguration failure procedure in case the UE is unable to comply with a configuration (or it's part) included in an RRC connection reconfiguration message.

The reconfiguration failure procedure in LTE is performed as follows.

In case a UE is unable to comply with a configuration (or it's part) included in an RRC connection reconfiguration message, the UE continually use a configuration having been used before the RRC connection reconfiguration message is received. If security has not been activated, an operation leaving an RRC CONNECTED state is performed by considering a release cause as other. If not, a connection re-establishment procedure is initiated.

Thus, since, in the typical LTE, the reconfiguration failure causes a UE to transition into an idle mode or to perform an RRC connection re-establishment procedure, and then results in service interruption.

Meanwhile, there is a possibility that NR may fail in an NR radio resource configuration procedure due to various causes. Accordingly, when failure occurs in an NR radio resource configuration procedure due to an arbitrary reason, it may be not efficient for a UE to transit into an idle mode or perform an RRC connection re-establishment procedure.

In order to solve this, if the UE fails in an NR configuration included in an NR RRC message (or in case the UE is unable to comply with the NR configuration included in an NR RRC message due to an arbitrary reason), a reconfiguration failure procedure should not be triggered. That is, NR RRC configuration failure should not trigger LTE RRC configuration failure. For example, if fails in an NR RRC configuration, a UE may transmit an RRC message (e.g., a SCG failure information message, a UE assistance message or an NR failure information/NR status message newly to be defined) including an NR RRC configuration failure cause to an NR BS. As another example, if fails in an NR RRC configuration, a UE may transmit an RRC message (e.g., a SCG failure information message, a UE assistance message or an NR failure information/NR status message newly to be defined) including an NR RRC configuration failure cause to an LTE BS. That is, if a UE fails in a radio resource configuration of a secondary BS by using an RRC message received through an SRB of a secondary BS, the UE may transmit corresponding failure information to a master BS.

Hereinafter, description on this will be more specifically given.

The received RRC message includes configuration information (for example, one or more of NR cell configuration information, NR bearer configuration information, control information for NR random access, NR measurement configuration information, NR mobility control and NR radio resource-dedicated configuration information) for configuring an NR radio resource. Hereinafter, for convenience of description, configuration information for adding an NR BS in dual connectivity or information for reconfiguring an NR radio resource through a secondary BS SRB are referred to as secondary BS radio resource configuration information, NR radio resource configuration information, NR configuration information or configuration information.

For example, in a case where an RRCConnectionReconfiguration message received through a master BS SRB includes NR radio resource configuration information, a UE (e.g., an RRC entity of the UE) performs an NR configuration.

As another example, in a case where an RRCConnectionReconfiguration message received through a secondary BS SRB includes NR radio resource configuration information, a UE (e.g., an RRC entity of the UE) performs an NR configuration.

In examples described above, in case the UE is unable to comply with the NR configuration, the UE continually use a (NR) configuration having been used before an RRC connection reconfiguration message is received (before NR configuration information is received.)

As another example, in case a UE (RRC) is unable to comply with an NR configuration, the using of the NR radio resource is suspended/stopped/held/released. The NR radio resource may include at least one of a secondary cell group data radio bearer (DRB), a secondary cell group SRB, a part of a secondary cell group of a split DRB, and a part of a secondary cell group of a split SRB.

As another example, in case a UE (RRC) is unable to comply with an NR configuration, the RRC transmits an RRC message including an NR RRC configuration failure cause to the LTE BS. The LTE BS transfers it to the NR BS.

As another example, in case a UE (RRC) is unable to comply with an NR configuration, the RRC may directly transmit an RRC message including an NR RRC configuration failure cause to the NR BS through interfaces between the UE and the NR BS.

2-2) Methods of Complying with a New Configuration Through Two RRC Entities in a UE As described above, NR may include independently evolutionary features other than the LTE. An LTE RRC and an NR RRC may be configured so that a UE can effectively implement those features.

When an MeNB transmits to a UE an RRC message including a new radio resource configuration of a SCG in the typical LTE dual connectivity, the UE performs a reconfiguration failure procedure in case the UE is unable to comply with a configuration (or it's part) included in an RRC connection reconfiguration message. A reconfiguration failure procedure in the LTE is performed as follows.

In case a UE is unable to comply with a configuration (or it's part) included in an RRC connection reconfiguration message, the UE continually use a configuration having been used before the RRC connection reconfiguration message is received. If security has not been activated, an operation leaving an RRC CONNECTED state is performed by considering a release cause as other. If not, a connection re-establishment procedure is initiated.

Thus, since, in the typical LTE, the reconfiguration failure causes the UE to transition into an idle mode or to perform an RRC connection re-establishment procedure, and then results in service interruption.

Meanwhile, there is a possibility that NR may fail in an NR radio resource configuration procedure due to various causes. Accordingly, when failure occurs in an NR addition procedure due to an arbitrary reason, it may be ineffective for a UE to transition into an idle mode or perform an RRC connection re-establishment procedure.

In order to solve this, if the UE fails in an NR configuration included in an NR RRC message (or in case the UE is unable to comply with an NR configuration included in an NR RRC message due to an arbitrary reason), a reconfiguration failure procedure should not be triggered. NR RRC configuration failure should not trigger LTE RRC configuration failure. If fails in an NR RRC configuration, the UE may transmit an RRC message (e.g., a SCG failure information message, a UE assistance message or an NR failure information/NR status message newly to be defined) including an NR RRC configuration failure cause to an NR BS (or an LTE BS). As another example, in case the UE (RRC) is unable to comply with the NR configuration, the RRC transmits an RRC message including an NR RRC configuration failure cause to the LTE BS. The LTE BS transmits it to the NR BS.

Hereinafter, description on this will be more specifically given.

If a received RRCConnectionReconfiguration message includes configuration information for configuring NR radio resource, the UE (NR RRC) performs the NR configuration.

As another example, in case the UE is unable to comply with the NR configuration, the UE continually use a (NR) configuration having been used before an RRC connection reconfiguration message is received (before NR configuration information is received.)

As another example, in case the UE (NR RRC) is unable to comply with the NR configuration, the using of the NR radio resource is suspended/stopped/held/released. The NR radio resource may include at least one of a secondary cell group data radio bearer (DRB), a secondary cell group SRB, a part of a secondary cell group of a split DRB, and a part of a secondary cell group of a split SRB.

As another example, in case the UE (NR RRC) is unable to comply with the NR configuration, the NR radio resource is released.

As another example, in case the UE (NR RRC) is unable to comply with the NR configuration, the NR RRC indicates NR reconfiguration failure to an LTE RRC. The LTE RRC transmits an RRC message including an NR RRC configuration failure cause to the LTE BS. The LTE BS transmits it to the NR BS.

As another example, in case the UE (NR RRC) is unable to comply with the NR configuration, the NR RRC may directly transmit an RRC message including an NR RRC configuration failure cause to the NR BS through interfaces between the UE and the NR BS.

Hereinafter, other examples on NR radio link failure will be described.

If radio link problem (failure) over an NR physical layer is detected, a UE may indicate the NR physical layer failure to an RRC entity. The RRC entity may indicate an RRC message including a failure cause for the NR physical layer failure to an LTE BS through an LTE SRB.

Hereinafter, another example on NR addition failure will be described in detail.

If experiences NR addition failure, the UE may inform a BS of it. For example, if experiences NR addition failure, the UE may inform an LTE BS of it through interfaces between the UE and the LTE SB. The LTE BS transfers it to an NR BS. As another example, if experiences NR addition failure, the UE may inform a NR BS of it through interfaces between the UE and the NR BS.

For example, when receiving an RRC connection reconfiguration message including NR addition information (for example, one or more of NR cell configuration information, NR bearer configuration information, control information for NR random access, and NR radio resource-dedicated configuration information), the UE starts a timer for detecting NR addition failure. This timer is included in the NR addition information. When this timer expires, an NR failure procedure may be initiated.

When the NR failure procedure is initiated, the UE may perform one or more of the following operations.

All of NR radio bearer, radio connection, radio flow, and NR transmission are suspended again.

NR medium access control (MAC) is reset again.

The timer stops when received is an RRC connection reconfiguration message including NR addition information again (for example, one or more of NR cell configuration information, NR bearer configuration information, control information for NR random access, and NR radio resource-dedicated configuration information).

Transmission of an NR failure information message (or a SCG failure information message or an RRC message, for convenience of description, hereinafter, referred to as "NR failure information message", but using a SCG failure information message or other RRC messages is also included within the scope of the present disclosure.) is initiated again.

If the UE initiates transmission of the NR failure information message, the UE includes a failure type. And, it is set as the NR radio addition failure.

The NR radio addition failure may denote failure to access the NR due to a cause different from the above described NR reconfiguration failure.

As described above, if fails in an NR radio resource configuration, the UE may transmit it to a BS through various operations. In addition, the UE may perform corresponding operations according to the failure.

Hereinafter, another example on NR addition will be described in detail.

The NR may establish radio bearer/radio connection/radio flow using the NR first according to the use of high frequencies and suspend a corresponding connection. Thereafter the NR may indicate that NR transmission should be initiated through radio bearer/radio connection/radio flow transmitting actual data.

For example, the NR may transmit an RRC connection reconfiguration message for establishing radio bearer/radio connection/radio flow using the NR and receive a confirmation message in response to this, and the NR may transmit to the UE an RRC connection reconfiguration message differentiated from it and including information indicating data transmission through radio bearer/radio connection/radio flow using the NR. For example, information indicating to initiate transmission by selecting any of data transmission through the LTE and data transmission through the NR for a specific radio bearer/radio connection/radio flow may be included in the RRC connection reconfiguration message.

As described above, according to embodiments of the present disclosure, NR RRC configuration failure (or NR RRC connection failure/NR radio resource addition failure/NR radio link failure) should not trigger LTE RRC configuration failure.

3. SRB configuration through an NR BS and an LTE BS

The NR may include radio communication features different from the LTE, and an LTE BS may not understand an RRC message generated by the NR BS.

The NR BS may directly transmit to a UE an NR RRC message including one or more control functions among an NR cell/cell group/transmission point/transmission point group/transmission and/or reception point/transmission and/or reception point group/TRP/antenna/antenna group/beam addition/modification/release/management, NR measurement, NR measurement reporting, NR resource allocation, NR radio bearer addition/correction/release, NR radio resource configuration, and NR mobility control.

However, the NR may be constructed even at a high frequency band (e.g., a high frequency of 6 GHz or more). In this case, fast SINR drops may occur according to link blockage of a high frequency band and high transmission loss, and a problem may be caused when an NR RRC is transmitted. To solve this problem, an NR RRC message should be transmitted by using all of interfaces between the NR BS and the UE and interfaces between the LTE BS and the UE in accordance with embodiments of the present disclosure.

Figure 5:
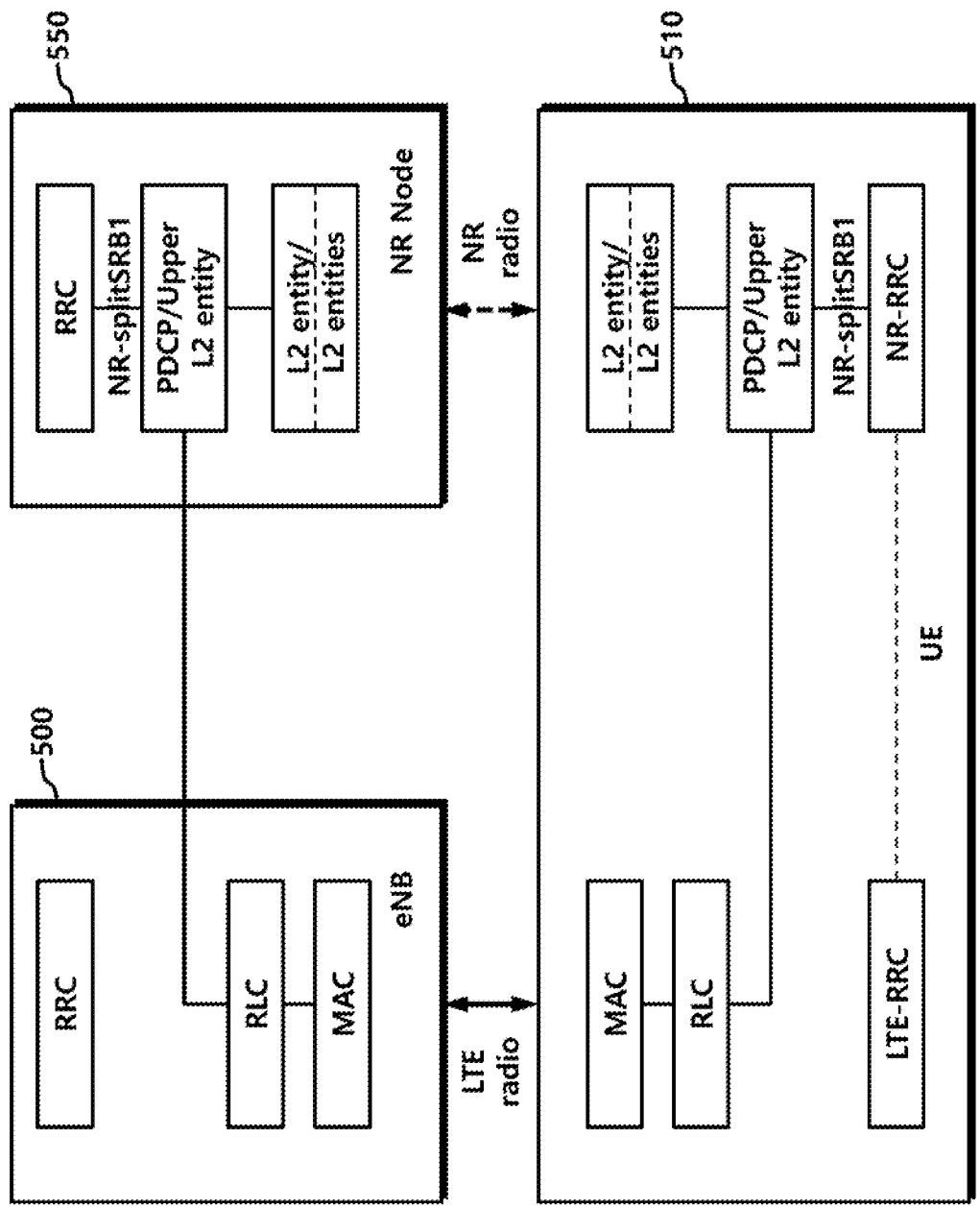
FIG. 5 is a diagram illustrating a dual connectivity SRB configuration according to another embodiment of the present disclosure.

FIG. 5 is a diagram illustrating a dual connectivity SRS configuration according to another embodiment of the present disclosure.

Referring to FIG. 5, for example, when LTE-NR dual connectivity (or when configuring an NR addition radio resource) is configured in a UE 510, an NR BS 550 may configure an SRB (e.g., SRB1 type) capable of the UE 510 using all of an LTE BS 500 and the NR BS 550. The SRB capable of using all of the LTE BS 500 and the NR BS 550, that is, a signaling radio bearer configured such that the NR BS may use all of the LTE BS and the NR BS is, for convenience of description, hereinafter, referred to as an NR-splitSRB1. The setting up of the NR-splitSRB1 should be configured through an RRC reconfiguration message configuring (reconfiguring) LTE-NR dual connectivity (configuring an NR addition radio resource).

When security is activated, a PDCP (or an L2 entity over the NR) may be required to perform integrity protection and ciphering on all RRC messages over the NR-splitSRB1, in consideration of that LTE-NR dual connectivity is applied to an RRC connected UE 510. Accordingly, a PDCP (or an (higher) L2 entity over the NR) is required to perform integrity protection and ciphering for all RRC messages over the NR-splitSRB1.

To do this, for the NR-splitSRB1, it is required to always activate security from the start. The NR BS 550 is required not to establish this bearer before activating security. The LTE BS 500 is required not to request NR BS addition before activating security. The NR BS 550 is required not to request to add the NR-splitSRB1 to LTE BS 500 before activating security. The NR BS 550 may establish the NR-splitSRB1 according to an NR BS addition request of the LTE BS 500. In addition, the NR BS 550 may establish the NR-splitSRB1 if necessary.

For example, when NR BS addition is required, the LTE BS 500 transmits (or calculates and then transmits) an NR BS key (e.g., NR-$K_{eNB}$) to the NR BS 550. The NR BS 550 selects an integrity protection algorithm and/or a ciphering algorithm. Then, the selected integrity protection algorithm and/or the ciphering algorithm (or identification information for the integrity protection algorithm and/or the ciphering algorithm) by which the NR-splitSRB1 is serviced to the UE 510 are transmitted to the UE 510 through the LTE BS 500. The LTE BS 500 (or NR BS 550) indicates a counter (SCG counter or NR counter) for the UE 510 counting a key value associated with the NR-splitSRB1. The UE 510 counts an NR BS key. The UE 510 counts a key value (NR-$K_{RRCint}$, NR-$K_{RRCenc}$) associated with an NR-SRB1. The UE 510 configures a lower layer (PDCP or L2 entity over the NR) to apply an integrity protection algorithm, ciphering algorithm, NR-$K_{RRCint}$, NR-$K_{RRCenc}$.

As another example, the NR BS 550 may indicate information for configuring the NR-splitSRB1 to the LTE BS 500. As described above, the LTE BS 500 may not understand an NR RRC container/NR RRC IEs of the NR BS 550. Accordingly, the NR BS 550 may contain information for indicating the LTE BS 500 to configure the NR-splitSRB1 in a signaling message over interfaces between the NR BS 550 and the LTE BS 500. When receiving information for indicating to configure the NR-splitSRB1, the LTE BS 500 may indicate information for configuring the NR-splitSRB1 to the UE 510. The LTE BS 500 may indicate that the UE 510 should preferentially process the NR-splitSRB1 over a DRB. For example, a specific logical channel identification information (logicalchannelIdentity) value may be designated to the NR-splitSRB1. The UE 510 should preferentially process a logical channel designated as the NR-splitSRB1 over a DRB. As another example, an logical channel identification information (logicalchannelIdentity) value (for example, 1) identical to the SRB1 may be designated to the NR-splitSRB1. As another example, information for processing with a priority identical to the SRB1 may be indicated to the NR-splitSRB1. As another example, information for indicating a signaling bearer is may be indicated to the NR-splitSRB1. As another example, information for processing with logical channel identification information (logicalchannelIdentity) value different from the SRB1 is designated to the NR-splitSRB1, but information for processing with a priority identical to the SRB1 may be indicated. For example, logical channel identification information identical to the SRB1 may be included. As another example, an SRB identification information (SRB-identity) value (for example, 1) identical to the SRB1 may be designated to the NR-splitSRB1. As another example, a logical channel configuration (e.g., priority(1 or 2), prioritisedBitRate(infinite)) value identical or similar to the SRB1 may be designated to the NR-splitSRB1. As another example, logical channel identification information identical to the SRB1 is included, but information for the UE identifying an entity for the NR-split SRB1 may be included.

As another example, logical channel identification information different from the SRB1 is included, but logical channel identification information identical to the SRB1 may be included.

4. SRB Configuration Through an LTE BS and an NR BS

The NR may include radio communication features different from the LTE, and an LTE BS may not understand an RRC message generated by the NR BS.

The NR BS may directly transmit to a UE an NR RRC message including one or more control functions among an NR cell/cell group/transmission point/transmission point group/transmission and/or reception point/transmission and/or reception point group/TRP/antenna/antenna group/beam addition/modification/release/management, NR measurement, NR measurement reporting, NR resource allocation, NR radio bearer addition/correction/release, NR radio resource configuration, and NR mobility control.

However, the NR may be constructed even at a high frequency band (e.g., a high frequency of 6 GHz or more). In this case, fast SINR drops may occur according to link blockage of a high frequency band and high transmission loss, and a problem may be caused when an NR RRC is transmitted. To solve this problem, an NR RRC message should be transmitted by using all of interfaces between an NR BS and a UE and interfaces between an LTE BS and the UE.

On the contrary, it may be preferable to transmitting some UL or DL RRC messages first through the LTE BS for reliability.

Figure 6:
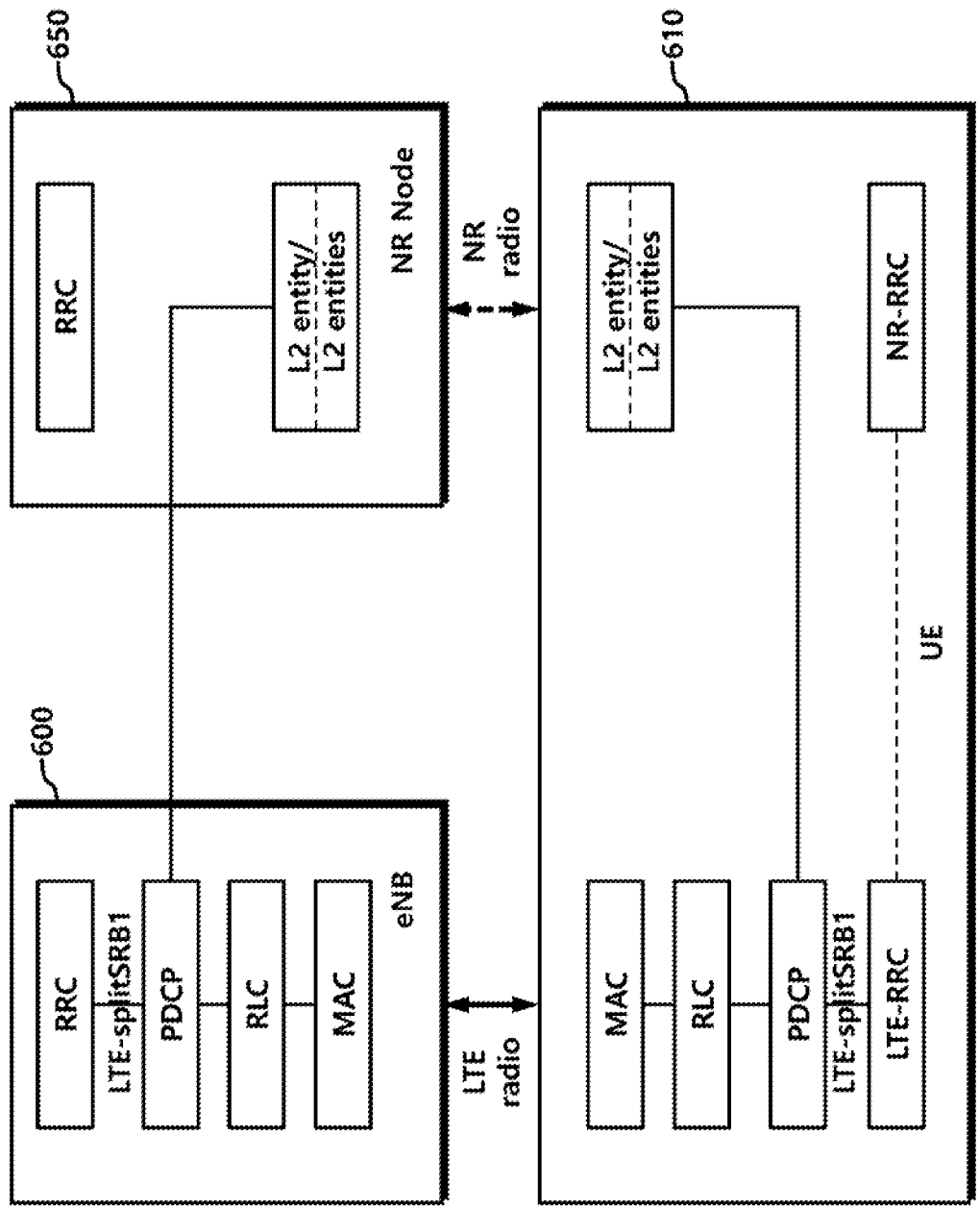
FIG. 6 is a diagram illustrating a dual connectivity SRB configuration according to further another embodiment of the present disclosure.

FIG. 6 is a diagram illustrating a dual connectivity SRS configuration according to further another embodiment of the present disclosure.

Referring to FIG. 6, for example, when LTE-NR dual connectivity (or when configuring an NR addition radio resource) is configured in a UE 610, an LTE BS 600 may configure an SRB (e.g., SRB1 type) capable of the UE 610 using all of the LTE BS 600 and an NR BS 650. The SRB capable of using all of the LTE BS 600 and the NR BS 650, that is, a signaling radio bearer configured such that the LTE BS can use all of the LTE BS and the NR BS is, for convenience of description, hereinafter, referred to as an LTE-splitSRB1. The establishment of LTE-splitSRB1 should be configured through an RRC reconfiguration configured through an RRC reconfiguration message configuring (reconfiguring) LTE-NR dual connectivity (configuring an NR addition radio resource).

It is required to perform integrity protection and ciphering for all RRC messages over the LTE-splitSRB1.

To do this, for the LTE-splitSRB1, it is required to always activate security from the start. The NR BS 600 is required not to establish this bearer before activating security. The LTE BS 600 is required not to request NR BS addition before activating security. The NR BS 650 may establish an NR configuration for the LTE-splitSRB1 according to indication information included in an NR BS addition request of the LTE BS 600.

For example, when requesting NR BS addition, the LTE BS 600 transmits information for indicating to configure the LTE-splitSRB1 to the NR BS 650. The NR BS 650 transmits information for configuring an NR part of the LTE-splitSRB1 (for example, one or more of logaicalchannelconfig, logicalchannelIdentity and rlcconfig) to a UE 610 through the LTE BS 600. As another example, the NR BS 650 may indicate information for identifying a configuration of the LTE-splitSRB1 to the LTE BS 600. As described above, the LTE BS 600 may not understand an NR RRC container/NR RRC IEs of the NR BS 650. Accordingly, the NR BS 650 may contain indication information for identifying an LTE-splitSRB1 configuration to the LTE BS 600 in a signaling message over interfaces between the NR BS 650 and the LTE BS 600. When receiving information for indicating to configure the LTE-splitSRB1, the LTE BS 600 may indicate information for configuring an LTE part of the LTE-splitSRB1 to the UE 610. The LTE BS 600 should preferentially process the LTE-SRB1 over a DRB. For example, a specific logical channel identification information (logicalchannelIdentity) value may be designated to the LTE-splitSRB1. It can be defined that the UE 610 should preferentially process a logical channel designated as the LTE-splitSRB1 over a DRB. As another example, a logical channel identification information (logicalchannelIdentity) value (for example, 1) identical to the SRB1 may be designated to the LTE-splitSRB1, or which may include SRB1 or SRB2.

The NR BS 650 should preferentially process the LTE-splitSRB1 over a DRB. For example, a specific logical channel identification information (logicalchannelIdentity) value may be designated to the LTE-splitSRB1. The UE 610 should preferentially process a logical channel designated as the LTE-splitSRB1 over a DRB. As another example, a logical channel identification information (logicalchannelIdentity) value (for example, 1) identical to the SRB1 may be designated to the LTE-splitSRB1, or which may be comprised of SRB1 or SRB2. As another example, information for indicating to process with a priority identical to the SRB1 may be indicated to the LTE-splitSRB1. As another example, information for indicating that this is a signaling bearer is may be indicated to the LTE-splitSRB1. As another example, a SRB identification information (SRB-identity) value (for example, 1) identical to the SRB1 may be designated to the LTE-splitSRB1. As another example, a logical channel configuration (e.g., priority(1 or 2), prioritisedBitRate(infinite)) value identical or similar to the SRB1 may be designated to the LTE-splitSRB1. As another example, the LTE-splitSRB1 may be processed along with the SRB1, and therefore a separate configuration may not be necessary. As another example, logical channel identification information identical to the SRB1 is included, but information for the UE identifying an entity for the LTE-split SRB1 may be included.

As another example, logical channel identification information different from the SRB1 is included, but logical channel identification information identical to the SRB1 may be included.

In this case, the LTE BS 600 may indicate to the UE information for indicating a route of RRC signaling message in a PDCP entity as the LTE BS 600 and the NR BS 650 (or the LTE BS 600 and the NR BS 650 and two BSs).

Hereinbefore, methods for configuring an SRB when a UE configures dual connectivity using the LTE BS and the NR BS according to embodiments have been described. Furthermore, methods for receiving radio resource configuration information for a UE configuring dual connectivity and methods for processing configuration failure or configuration success when a radio resource is configured by using radio resource configuration information according to embodiments have been described.

As discussed above, according to embodiments of the present disclosure, radio resource control signaling may be provided for LTE-NR dual connectivity operation supporting tight interworking between the LTE and the NR. In addition, according to embodiments of the present disclosure, an effective radio connection failure process may be effectively performed in a signaling process between an LTE BS and an NR BS and/or between a UE and any of the LTE BS and the NR BS.

Hereinafter, configurations of a UE and a BS capable of performing a part or all of the embodiments described with reference to FIGS. 1 to 6 will be discussed with reference to the drawings.

Figure 7:
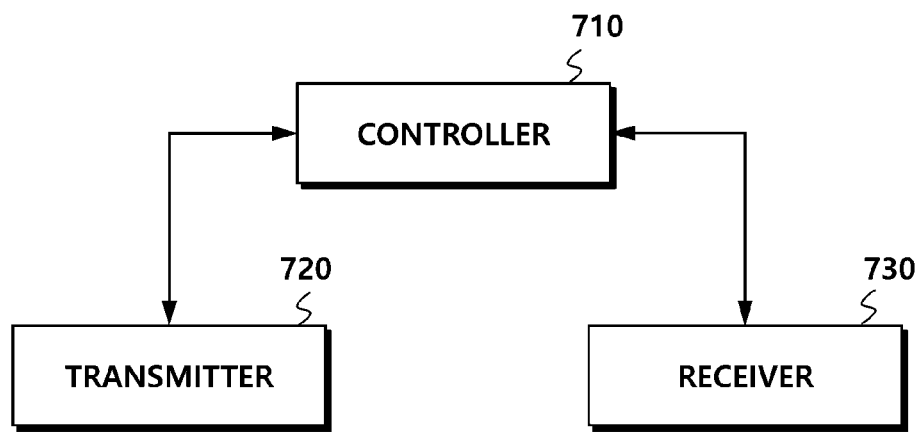
FIG. 7 is a block diagram illustrating a user equipment according to some embodiments of the present disclosure.

FIG. 7 is a block diagram illustrating a UE according to some embodiments of the present disclosure.

Referring to FIG. 7, a UE 700 configuring dual connectivity may include a controller 710 adding and configuring a secondary BS signaling radio bearer (SRB), a receiver 730 configured to receive a radio resource control (RRC) message including radio resource configuration information on a secondary BS or a secondary cell group through the secondary BS SRB, and a transmitter 720 configured to transmit a failure information message to a master BS in case the UE is unable to comply with the radio resource configuration information included the RRC message.

For example, the controller 710 may add and configure a secondary BS SRB in the UE. As described above, the secondary BS denotes a NR BS. The master BS and the secondary BS are BSs using radio access technologies different from each other, and the master BS may be an eNB and the secondary BS may be a gNB. Meanwhile, the addition of a secondary BS SRB may be determined by the secondary BS. That is, the secondary BS may determine whether to add a secondary BS SRB to the UE.

When a master BS performs a secondary BS addition procedure, the controller 710 may configure a secondary BS SRB. In addition, the controller 710 configures a secondary BS radio resource using a secondary BS SRB needed for performing embodiments described above, and controls overall operations of the UE 700 according to whether radio resource configuration is successful.

For example, the receiver 730 may receive radio resource configuration information on the secondary BS through the additionally configured secondary BS SRB. As another example, the receiver 730 may receive radio resource configuration information on the secondary cell group through the secondary BS SRB. The radio resource configuration information on the secondary BS or the secondary cell group may be received being included in an RRC message.

Here, the secondary cell group (SCG) denotes one or more cells associated with the secondary BS, and one or more cells associated with the master BS may referred to as a master cell group. That is, when configuring the dual connectivity, the UE may use one cell of each BE or a plurality of cells controlled by each cell.

Meanwhile, the controller 710 may comply with, in the UE, a secondary BS or a secondary cell group by using the received radio resource configuration information. It may not be possible to configure dual connectivity by using the received radio resource configuration information due to any reason. In this case, the transmitter 720 may transmit a failure information message to the master BS, and therefore may inform it of dual connectivity configuration failure of the UE.

In addition, in case the UE is unable to comply with the radio resource configuration included in an RRC message and therefore fails to the secondary BS radio resource configuration, the radio resource on the secondary BS or the secondary cell group may be suspended. For example, the radio resource on the secondary BS or the secondary cell group, which is to be suspended, may be at least one of a secondary cell group data radio bearer (DRB), a secondary cell group SRB, a part of a secondary cell group of a split DRB, and a part of a secondary cell group of a split SRB.

In addition, the failure information message transmitted to the master BS may include cause information on the secondary BS radio resource configuration failure.

In this case, the secondary BS may identify this by receiving information on the secondary BS radio resource configuration failure from the master BS.

Meanwhile, if the UE successfully complies with the received radio resource configuration information, and the radio resource configuration is performed, the transmitter 720 may transmit confirmation information on radio resource configuration success to the secondary BS through the secondary BS SRB.

In addition, the receiver 730 is configured to receive DL control information and data, messages from the BS through a corresponding channel. The transmitter 720 is configured to transmit UL control information and data, messages to the BS through a corresponding channel.

Figure 8:
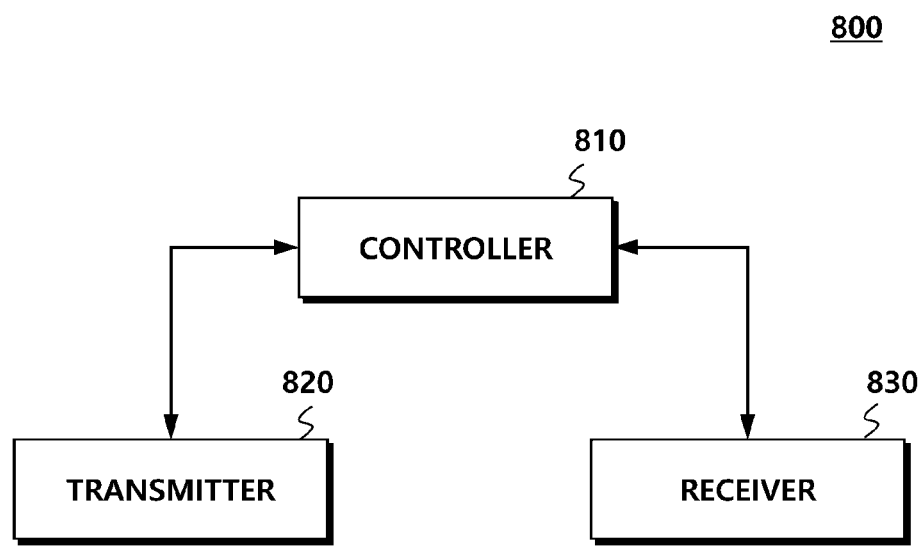
FIG. 8 is a block diagram illustrating a base station according to some embodiments of the present disclosure.

FIG. 8 is a block diagram illustrating a BS according to some embodiments of the present disclosure.

Referring to FIG. 8, a secondary BS controlling dual connectivity of a UE includes a controller 810 configured to determine to add a secondary BS signaling radio bearer (SRB) to a UE, a transmitter 820 configured to transmit a radio resource control (RRC) message including radio resource configuration information on a secondary BS or a secondary cell group to the UE through the secondary BS SRB, and a receiver 830 configured to receive a response message for a radio resource configuration through the secondary BS SRB if the UE successfully complies with the radio resource on the secondary BS. In this case, the UE may configure dual connectivity by using the master BS and the secondary BS.

As described above, the secondary BS denotes a NR BS. Meanwhile, the addition of the secondary BS SRB may be determined by the secondary BS. That is, the controller 810 may determine whether to add a secondary BS SRB to the UE. When a master BS performs a secondary BS addition procedure, the UE may add a secondary BS SRB. The master BS and the secondary BS area BSs using radio access technologies different from each other, and the master BS may be an eNB and the secondary BS may be a gNB.

Meanwhile, the transmitter 820 may transmit radio resource configuration information on the secondary BS through the additionally configured secondary BS SRB. As another example, the transmitter 820 may transmit radio resource configuration information on the secondary cell group through the secondary BS SRB. The radio resource configuration information on the secondary BS or the secondary cell group may be transmitted being included in an RRC message.

Here, the secondary cell group (SCG) denotes one or more cells associated with the secondary BS, and one or more cells associated with the master BS may referred to as a master cell group. That is, when configuring the dual connectivity, the UE may use one cell of each BE or a plurality of cells controlled by each cell.

It may not be possible to configure dual connectivity by using the received radio resource configuration information due to any reason. In this case, the UE may transmit a failure information message to the master BS, and therefore may inform it of dual connectivity configuration failure of the UE. The failure information message transmitted to the master BS may include cause information on the secondary BS radio resource configuration failure. In this case, the receiver 830 may identify this by receiving information on the secondary BS radio resource configuration failure from the master BS.

In addition, in case the UE is unable to comply with the radio resource configuration included in an RRC message and therefore fails to the secondary BS radio resource configuration, the radio resource on the secondary BS or the secondary cell group may be suspended. For example, the radio resource on the secondary BS or the secondary cell group, which is to be suspended, may be at least one of a secondary cell group data radio bearer (DRB), a secondary cell group SRB, a part of a secondary cell group of a split DRB, and a part of a secondary cell group of a split SRB. Through operations described above, a UE can configure dual connectivity by using a plurality of BSs that use radio access network technologies different from one another.

In addition, the controller 810 configures a secondary BS radio resource using a secondary BS SRB needed for performing embodiments described above in a UE, and controls overall operations of a BS 800 for providing radio resource control signaling for LTE-NR dual connectivity operations supporting tight interworking between LTE and NR according to whether the UE successfully complies with radio resource configuration.

In addition, the transmitter 820 and the receiver 830 are configured to transmit or receive signals, messages, data required to perform embodiments described above to or from the UE and a master BS.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of a user equipment for configuring dual connectivity, the method comprising:
  adding and configuring a secondary base station signaling radio bearer (SRB);
  receiving from a secondary base station, a radio resource control (RRC) message including radio resource configuration information on the secondary base station or a secondary cell group through the secondary base station SRB; and
  transmitting a failure information message to a master base station in case the user equipment is unable to comply with the radio resource configuration information included in the RRC message,
  wherein the addition of the secondary base station SRB is determined by the secondary base station.

2. The method according to claim 1, wherein the master base station and the second base station are base stations using radio access technologies different from each other.

3. The method according to claim 1, wherein the addition of the secondary base station SRB is configured when the master base station performs a secondary base station addition procedure.

4. The method according to claim 1, wherein, in case the user equipment is unable to comply with the radio resource configuration information included in the RRC message and therefore fails to a secondary BS radio resource configuration, a radio resource on the secondary base station or the secondary cell group is suspended.

5. The method according to claim 4, wherein the radio resource on the secondary base station or the secondary cell group includes at least one of a secondary cell group data radio bearer (DRB), a secondary cell group SRB, a part of a secondary cell group of a split DRB, and a part of a secondary cell group of a split SRB.

6. The method according to claim 1, wherein the failure information message includes cause information on the secondary base station radio resource configuration failure.

7. A method of a secondary base station for controlling dual connectivity of a user equipment, the method comprising:
   determining, by the secondary base station, to add a secondary base station signaling radio bearer (SRB) to the user equipment;
   transmitting a radio resource control (RRC) message including radio resource configuration information on the secondary base station or a secondary cell group to the user equipment through the secondary base station SRB; and
   receiving a response message for a radio resource configuration from the user equipment through the secondary BS SRB if the UE successfully complies with a radio resource on the secondary base station,
   wherein the user equipment configures dual connectivity by using a master base station and the secondary base station.

8. The method according to claim 7, wherein the master base station and the secondary base station are base stations using radio access technologies different from each other.

9. The method according to claim 7, wherein, in case the user equipment is unable to comply with the radio resource configuration information included in the RRC message, the user equipment is configured to transmit a failure information message to the master base station.

10. A user equipment for configuring dual connectivity, the user equipment comprising:
    a controller configured to add and configure a secondary base station signaling radio bearer (SRB);
    a receiver configured to receive from a secondary base station, a radio resource control (RRC) message including radio resource configuration information on the secondary base station or a secondary cell group through the secondary base station SRB; and
    a transmitter configured to transmit a failure information message to a master base station in case the user equipment is unable to comply with the radio resource configuration information included in the RRC message,
    wherein the addition of the secondary base station SRB is determined by the secondary base station.

11. The user equipment according to claim 10, wherein the master base station and the secondary base station are base stations using radio access technologies different from each other.

12. The user equipment according to claim 10, wherein the addition of the secondary base station SRB is configured when the master base station performs a secondary base station addition procedure.

13. The user equipment according to claim 10, wherein, in case the user equipment is unable to comply with the radio resource configuration information included in the RRC message and fails to a secondary BS radio resource configuration, a radio resource on the secondary base station or the secondary cell group is suspended.

14. The user equipment according to claim 13, wherein the radio resource on the secondary base station or the secondary cell group includes at least one of a secondary cell group data radio bearer (DRB), a secondary cell group SRB, a part of a secondary cell group of a split DRB, and a part of a secondary cell group of a split SRB.

15. The user equipment according to claim 10, wherein the failure information message includes cause information on the secondary base station radio resource configuration failure.

* * * * *